United States Patent [19]

Takahashi et al.

[11] Patent Number: 5,766,791
[45] Date of Patent: Jun. 16, 1998

[54] SEALED NONAQUEOUS SECONDARY BATTERY

[75] Inventors: Osamu Takahashi; Shigeru Andou; Wataru Nakamura; Hisashi Suzuki, all of Kanagawa, Japan

[73] Assignee: Fuji Photo Film Co., Ltd., Kanagawa, Japan

[21] Appl. No.: 713,641

[22] Filed: Sep. 13, 1996

[30] Foreign Application Priority Data

Sep. 21, 1995 [JP] Japan .................. 7-242816

[51] Int. Cl.$^6$ .................................................. H01M 2/12
[52] U.S. Cl. .................. 429/57; 429/53; 429/59
[58] Field of Search .................. 429/53, 56, 54, 429/57, 61, 72

[56] References Cited

U.S. PATENT DOCUMENTS 5,418,082  5/1995  Taki et al. .................. 429/53
5,567,539  10/1996  Takahashi et al. .................. 429/57

*Primary Examiner*—M. Nuzzolillo
*Attorney, Agent, or Firm*—Sughrue, Mion, Zinn, Macpeak & Seas PLLC

[57] ABSTRACT

A sealed nonaqueous secondary battery comprising a sealed-end battery case containing an electrodes assembly composed of a cathode, and an anode both capable of intercalating and deintercalating a light metal, a separator therebetween and a nonaqueous electrolytic solution, the opening of said battery case being sealed with an insulating gasket which is provided at the inner periphery of said opening and a sealing part which is held by the gasket and serves as a cathode or anode terminal, wherein the sealing part comprises an explosion-proof valve which is capable of being deformed to the direction opposite to the electrodes assembly with an increase in internal pressure, a vented terminal cap which is provided above the explosion-proof valve in the side opposite to the electrodes assembly, and a current breaker which is provided between the explosion-proof valve and the terminal cap; the current breaker having a piled structure composed of a first electric conductor having a penetrated hole which is provided at a side of the explosion-proof valve, an intermediate insulator having a penetrated hole at the central portion thereof, and a second electric conductor having a penetrated hole which is provided at a side of the terminal cap; the first electric conductor and the second electric conductor being electrically connected at the center thereof; and the first electric conductor having a thin part at the periphery of its joint with the second electric conductor.

6 Claims, 6 Drawing Sheets

SEALED NONAQUEOUS SECONDARY BATTERY

FIELD OF THE INVENTION

This invention relates to a sealed nonaqueous secondary battery which can cut off electric circuit in the battery with an increase in its internal pressure.

BACKGROUND OF THE INVENTION

With the recent development of high performance, small-sized, and portable electronic equipment, secondary batteries having a higher energy density to take the place of conventional ones, such as nickel-cadmium batteries and lead batteries, have been demanded for use as a power source of such electronic equipment. Hence, the today's study has been given to development of nickel-hydrogen batteries using a hydrogen-intercalating metallic alloy for the anode and nonaqueous secondary batteries using an active material capable of intercalating and deintercalating a light metal for the cathode and anode. These types of batteries are now extending their use in some kinds of electronic equipment. In particular, sealed nonaqueous secondary batteries utilizing intercalation and deintercalation of lithium have a battery voltage as high as 3.6 V and a high energy density and are therefore expected to achieve reductions in size and weight. Further, they have a little self discharge and excellent cycle characteristics. For these reasons, sealed nonaqueous secondary batteries of this kind are expected to come into wide use as a power source of portable equipment.

In general, a sealed secondary battery increases its temperature in case of a shortcircuit or an overcharge, and as a result the electrolytic solution is vaporized to increase the internal pressure. If such a situation lasts to keep increasing the internal pressure, the battery would burst at last, and the surrounding equipment would be damaged. In order to avoid this, batteries of sealed type have an explosion-proof valve through which inside gas can be released when the internal pressure reaches a prescribed level.

Sealed nonaqueous secondary batteries also have an explosion-proof valve. However, according to the latest reports, there are cases in which the internal pressure continues increasing even after the explosion-proof valve works at a prescribed internal pressure particularly in case of an overcharge, and the battery finally catches fire and bursts. This seems to be because electric current continues passing even after release of gas, so that the battery temperature and voltage continue increasing. It ultimately follows that such abnormal reactions as rapid decomposition of the electrolyte or the active material take place, resulting in an abrupt increase in battery temperature. Therefore, it is effective for preventing such an abnormal phenomenon to detect the internal pressure or temperature and to completely cut off the charging current. A few proposals for this purpose have been made to date, some of which have been put to practical use.

For example, JP-A-2-112151 (the term "JP-A" as used herein means an "unexamined published Japanese patent application") discloses a battery whose sealing part is shown in FIG. 9. The sealing part of FIG. 9 is composed of an explosion-proof valve 6 having, at the center thereof, a projection toward a group of electrodes, an insulating stripper 15 provided in contact with the lower side of the explosion-proof valve 6 and having a penetrated hole at the center thereof into which the projection of the explosion-proof valve 6 is put, and a lead plate 4 which is led from a grid of the electrode group and welded to the lower side of the projection of the explosion-proof valve 6 so as to make a connection between the lower side of the stripper 15 and the lower side of the projection of the explosion-proof valve 6. If the internal pressure begins to increase due to an overcharge, a shortcircuit, etc., the explosion-proof valve is deformed to the direction opposite to the electrode group. Consequently, the lead plate which is welded to the projection of the explosion-proof valve is peeled off and/or broken at the welded joint to thereby cut off the current. Thus, the worst, i.e., ignition or a burst of the battery can be avoided. Improvements have been added to the above-described mechanism cutting off the current, including a battery in which the stripper is fitted to the explosion-proof valve by means of a resin-made mating part to improve ease of assembly operation (JP-A-2-288063 and U.S. Pat. No. 4,943,497), a battery in which the stripper has a plurality of holes, and the explosion-proof valve has a thin part formed by making a groove on its surface to improve the safety (JP-A-U-4-24262, the term "JP-A-U" as used herein means an "unexamined published Japanese utility model application"), and a battery shown in FIG. 10 in which a thin metal plate is provided between the lower side of the projection of the explosion-proof valve and the lead plate, or the stripper is replaced with a metal disc 16 having gas vents, which is fixed to the explosion-proof valve by means of a resin-made disc holder 17, and the lower side of the projection of the explosion-proof valve is welded to the metal disc, and the lead plate is connected to the lower side (electrode side) of the metal disc (JP-A-5-343043).

According to these proposals, the precision in cutting off the current flow is decided by the correlation between the break or peeling strength of the welded joint and the tensile stress of the explosion-proof valve and is greatly dependent on the weld strength. If the weld strength varies with variation of the surface profile or surface oxidation condition of the welding area, the internal pressure at which current is cut off also varies. Further, after welding, when a lead plate is bent and the whole sealing part is inserted into a battery case, the bending stress generated in the lead plate acts on the welded joint as a tensile or pressing force, tending to reduce the weld strength, vary the internal pressure at cut-off of current, or peel off the welded joint on vibration or dropping of the battery. Furthermore, in the case of the nonaqueous batteries using an organic solvent in the electrolytic solution, because the welded joint is exposed to the inside atmosphere of the battery, cases tend to occur in which the organic solvent vapor catches fire from the spark which may be produced on breakage or peeling off of the welded joint to cut off the current, causing the battery to ignite or burst.

In the light of the above problems, batteries having a current breaker on the side of an explosion-proof valve opposite to the electrode group, where the current breaker is not exposed to the inside atmosphere have been proposed. For example, JP-A-6-215760 discloses the battery shown in FIG. 11, the sealing part of which comprises an internal lid 18 having a penetrared hole in the central portion thereof having provided thereon an explosion-proof valve 6, an inner insulating packing 19 having a penetrated hole in the central portion thereof, and a terminal cap in this order. The periphery each of the internal lid 18 and the inner insulating packing 19 is bent to hold safety valve 6 and the terminal cap. Further, a current cutting-off lead 20 is provided with its one end held between the internal lid 18 and the insulating packing 19 and the other end, passing through the penetrated hole of the packing, held between the insulating packing and the terminal cap. In this battery, when the internal pressure begins to increase, the explosion-proof valve is deformed in the side opposite to the electrode group and, at the same time, the current cutting-off lead on the explosion-proof valve is pushed up. When the stress in the lead exceeds its limit, the lead is broken to cut off the current.

According to JP-6-215760, however, since the current cutting-off lead is held by being pressed at one end thereof onto the explosion-proof valve, cases sometimes occur in which the explosion-proof valve generates cracks at the area contacting the end of the cutting-off lead during assembly or while deformed with an increase in internal pressure. This being the case, there is involved a danger that, in case of an overcharge, the vapor inside the battery escapes through the cracks of the explosion-proof valve before the current is cut off. As a result, the explosion-proof valve fails to push up the current cutting-off lead, causing the battery to ignite or burst. Even when the current cutting-off mechanism works normally, broken pieces of the current cutting-off lead become rootless and may be brought into contact with each other, or the piece of the lead remaining connected to the electrode group may contact with the terminal cap, to thereby restore the electric current flow.

A current cutting-off mechanism based detected changes in battery temperature instead of changes in internal pressure has also been proposed. JP-A-5-205727 discloses the sealing part shown in FIG. 12, which comprises a bimetal 21 provided at the periphery of a cap serving as a cathode or anode, a sealing plate 22 which is electrically connected to the bimetal 21 in a normal state, and a lead plate 4 which is led from a grid of a group of electrodes and connected to the electrode side of the sealing plate 22. When the battery temperature starts increasing due to a shortcircuit, etc., the bimetal works to cut off the current to the sealing plate thereby preventing abnormal overheat. When the battery temperature returns to its normal level, the bimetal is restored to restore the current flow, and the battery becomes usable again.

The above-described mechanism, while effective in case of a temperature rise due to a shortcircuit, does not always ensure safety in case of an overcharge. That is, while the bimetal repeats working and restoration, the battery voltage tends to keep increasing gradually, which would finally result in ignition or a burst of the battery.

SUMMARY OF THE INVENTION

An object of the present invention is to provide a sealed type nonaqueous secondary battery which cuts off the electric current in the battery completely at the beginning of an increase in its internal pressure in case of abnormalities, such as an overcharge or a shortcircuit.

The object of the invention is accomplished by a sealed nonaqueous secondary battery comprising a sealed-end battery case containing an electrodes assembly composed of a cathode, and an anode both capable of intercalating and deintercalating a light metal, a separator therebetween, and a nonaqueous electrolytic solution, the opening of the battery case being sealed with an insulating gasket which is provided at the inner periphery of the opening and a sealing part which is held by the gasket and serves as a cathode or anode terminal, wherein the sealing part comprises an explosion-proof valve which is capable of being deformed to the direction opposite to the group of electrodes assembly with an increase in internal pressure, a vented terminal cap which is provided above the explosion-proof valve in the side opposite to the electrodes assembly, and a current breaker which is provided between the explosion-proof valve and the terminal cap; the current breaker having a piled structure composed of a first electric conductor having a penetrated hole which is provided at a side of the explosion-proof valve, an intermediate insulator having a penetrated hole at the central portion thereof, and a second electric conductor having a penetrated hole which is provided at a side of the terminal cap; the first electric conductor and the second electric conductor being electrically connected at the center thereof; and the first electric conductor having a thin part at the periphery of its central joint with the second electric conductor.

DETAILED DESCRIPTION OF THE INVENTION

Figure 1:
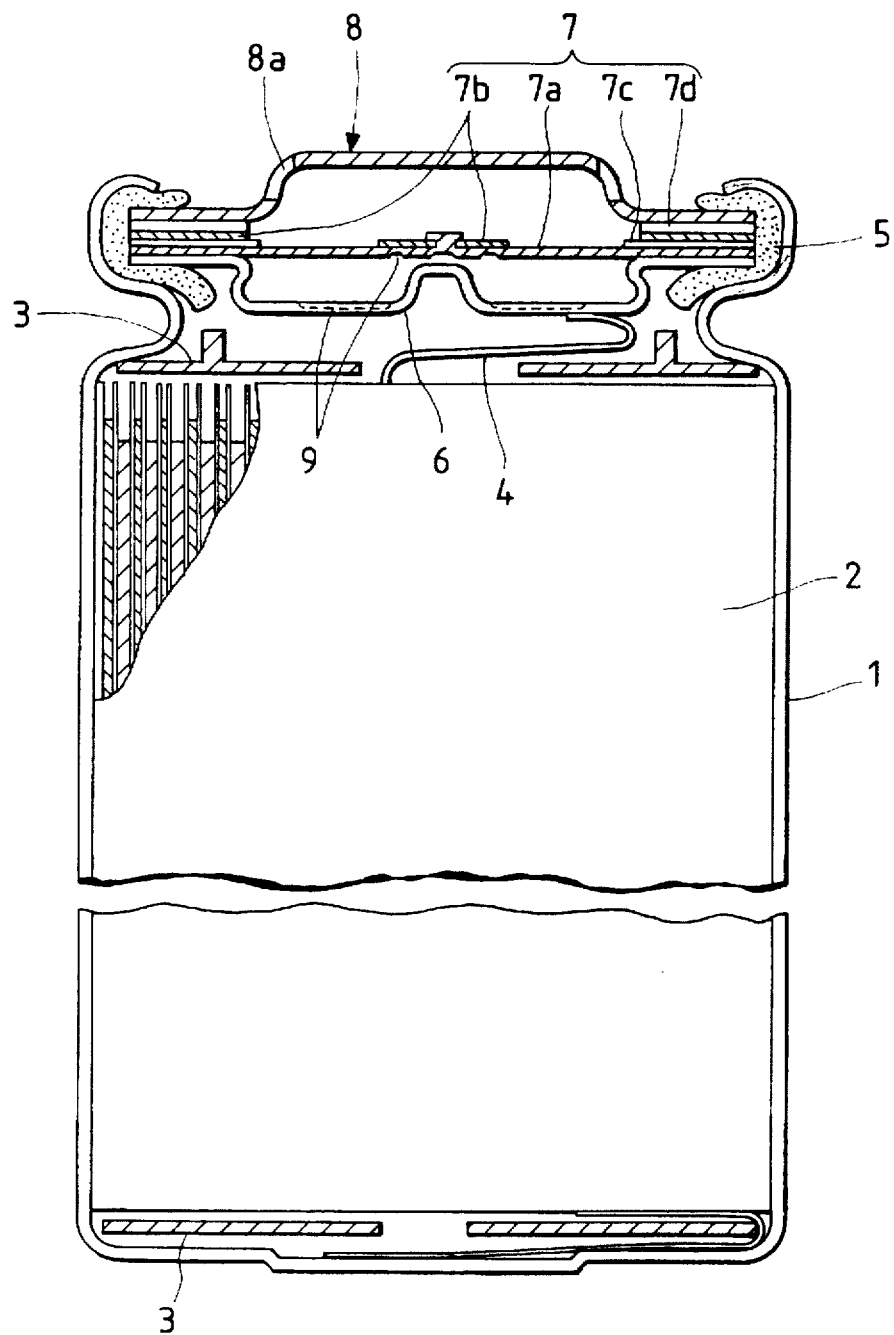
FIG. 1 is a partial schematic cross section of an example of the sealed nonaqueous secondary battery according to the present invention.

The first electric conductor constituting the current breaker is preferably made of aluminum or an aluminum alloy, particularly aluminum of #1000, #3000 or #5000 series according to JIS H4000. The first electric conductor preferably has a thickness of 0.2 to 1 mm. The thickness in the vicinities of the thin part is preferably 0.3 to 0.5 mm.

The second electric conductor constituting the current breaker is made of any material having a spring action, preferably stainless steel, nickel-plated phosphor bronze, nickel, aluminum, an aluminum alloy, or a shape memory alloy. The second electric conductor preferably has a thickness of 0.1 to 0.3 mm. Where the first electric conductor is made of aluminum or an alloy thereof, the second electric conductor is preferably made of the same material, particularly aluminum of #1000, 3000 or 5000 series according to JIS H4000.

The intermediate insulator constituting the current breaker is made of any material having electrically insulating properties, preferably a resin. The intermediate insulator preferably has a thickness of 0.05 to 0.3 mm.

The thin part of the first electric conductor is preferably formed by making a groove especially on the side facing the explosion-proof valve. The thin part preferably has a thickness of from at least 0.05 mm to a half of the thickness of the first electric conductor in the vicinities of the thin part and a width of not more than 2 mm, particularly not more than 1 mm.

The second electric conductor preferably has a ring form with a pier-like projection extending from the ring to the center (hereinafter simply referred to as a pier). It is particularly preferable that the pier is previously formed as bent toward the terminal cap so that the pier may be connected to central portion of the first electric conductor via an intermediate insulator while embracing the force of a leaf spring. When a shape memory alloy is used as a second electric conductor, the pier is preferably designed to be deformed by itself toward the terminal cap with an increase in temperature.

The first electric conductor and the second electric conductor are preferably connected by cramping and/or welding. It is particularly preferred that a small projection is made at the center of the first electric conductor, while a small hole is made in the pier of the second electric conductor at the position corresponding to the small projection of the first electric conductor, and the small projection is cramped into the small hole to form a mechanical joint. If necessary, the small projection and the inner periphery of the small hole may be welded together.

The explosion-proof valve side of the first electric conductor at the area inside the thin part(s), which is (are) formed at the peripheral portion of the central joint with the second electric conductor, is preferably coated with a nonconductive material.

The outer diameter of the second electric conductor preferably is smaller than that of the first electric conductor by 0.1 to 2 mm.

If the outer diameter of the second electric conductor is larger than or equal to that of the first electric conductor, when the current breaker is cramped with a gasket together with other members, the resistance of joint portion between the first electric conductor and the second electric conductor is sometimes increased.

It is preferable to provide a positive temperature resistance coefficient element (hereinafter abbreviated as a PTC element) on the current breaker.

The explosion-proof valve for use in the present invention is not particularly limited as far as it can be deformed opposite the electrode group with an increase in internal pressure to push up the central joint of the first electric conductor. A preferred explosion-proof valve has a dish shape with its flat round base projected from near the periphery toward the electrode group and with an element at the center of the flat base, in which the element is capable of pushing up the central joint of the first electric conductor with an increase in internal pressure. An explosion-proof valve having at the center thereof an integrally formed projection toward the current breaker as described in JP-A-8-153536 is still preferred.

The above-identified element capable of pushing up the first electric conductor is preferably made of a nonconductive material. The integrally formed projection preferably has its top coated with a nonconductive material.

The cathode or anode for use in the nonaqueous secondary battery of the present invention can be prepared by applying a positive electrode material mixture or a negative electrode material mixture to a collector or by molding the respective mixture into a pellet. The positive or negative electrode material mixture comprises a positive electrode active material or a negative electrode material, a conducting agent, a binder, a dispersant, a filler, an ion-conductive agent, a pressure increasing agent, and other additives.

The active material for the cathode is not particularly limited, provided that it is capable of intercalating and deintercalating a light metal. The positive electrode active material is preferably a lithium-containing transition metal oxide. Suitable examples of the lithium-containing metal oxide are $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $LiMn_2O_3$, $Li_xMn_bCo_{2-b}O_z$, $Li_xMn_bNi_{2-b}O_z$, $Li_xMn_bV_{2-b}O_z$, and $Li_xMn_bFe_{1-b}O_z$ (wherein x=0.05 to 1.2; a=0.1 to 0.9; b=0.8 to 0.98; and z=1.5 to 5).

The term "light metal" as used herein means an element belonging to the groups 1A (exclusive of hydrogen) and 2A of the Periodic Table. The examples of the light metal preferably includes lithium, sodium, and potassium, with lithium being particularly preferred.

The active material for the anode is not particularly limited provided that it is capable of intercalating and deintercalating a light metal. Suitable examples of the negative electrode active material include graphite (natural graphite, artificial graphite and vapor phase growth graphite), coke (coal coke and petroleum coke), calcined organic polymers (e.g., calcination products of polyacrylonitrile resins or fiber, furan resins, cresol resins and phenolic resins), calcined meso phase pitch, metal oxides, metal chalcogenides, lithium-containing transition metal oxides, and chalcogenides.

Preferred of them are oxides and chalcogenides of Ge, Sn, Pb, Bi, Al, Ga, Si, Sb or a combination thereof. Amorphous oxides or chalcogenides obtained by adding to the above oxides or chalcogenides a "network forming agent", such as $SiO_2$, $B_2O_3$, $P_2O_5$, $Al_2O_3$, $V_2O_5$, are particularly preferred. These compounds may have a stoichiometric or non-stoichiometric composition. Specific but non-limiting examples of these compounds are GeO, $GeO_2$, SnO, $SnO_2$, $SnSiO_3$, PbO, SiO, $Sb_2O_5$, $Bi_2O_3$, $Li_2SiO_3$, $Li_4Si_2O_7$, $Li_2GeO_3$, $SnAl_{0.4}B_{0.5}P_{0.5}K_{0.1}O_{3.65}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}Ba_{0.08}O_{3.28}$, $SnAl_{0.5}B_{0.4}P_{0.5}Mg_{0.1}F_{0.2}O_{3.65}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $Sn_{1.1}Al_{0.4}B_{0.4}P_{0.4}Ba_{0.08}O_{3.34}$, $Sn_{1.2}Al_{0.5}B_{0.3}P_{0.4}Cs_{0.2}O_{3.5}$, $SnSi_{0.5}Al_{0.2}B_{0.1}P_{0.1}Mg_{0.1}O_{2.8}$, $SnSi_{0.5}Al_{0.3}B_{0.4}P_{0.5}O_{4.30}$, $SnSi_{0.6}Al_{0.1}B_{0.1}P_{0.1}Ba_{0.2}O_{2.95}$, $SnSi_{0.6}Al_{0.4}B_{0.2}Mg_{0.1}O_{3.2}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, and $Sn_{0.2}Mn_{0.8}Mg_{0.1}P_{0.9}O_{3.35}$.

The negative electrode material can be used with a light metal, especially lithium intercalated therein. Lithium can preferably be intercalated by an electrochemical, chemical or thermal process.

Lithium may be intercalated till the electrode potential approximates to that of lithium precipitation. The amount to be intercalated is preferably 50 to 700 mol %, particularly preferably 100 to 600 mol %, per the above-described preferred negative electrode material.

The electric conducting agent which can be used in the cathode and the anode includes graphite, acetylene black, carbon black, ketjen Black, carbon fiber, metal powder, metallic fiber, and polyphenylene derivatives. Graphite and acetylene black are particularly preferred.

Examples of the binder which can be used in the cathode and the anode include polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, SBR, ethylene-propylene-diene terpolymers (EPDM), sulfonated EPDM, fluorine rubbers, polybutadiene, and polyethylene oxide, with polyacrylic acid, carboxymethyl cellulose, polytetrafluoroethylene, and polyvinylidene fluoride being preferred.

The support, i.e., collector, for use in the cathode is made of aluminum, stainless steel, nickel, titanium or an alloy of these metals; and that for use in the anode is made of copper, stainless steel, nickel, titanium, or an alloy of these metals. The form of the collector includes a foil, an expanded metal sheet, a punched metal sheet, and a metallic net. An aluminum foil is preferred for the cathode, and a copper is preferred for the anode.

As a separator, an insulating thin film having high ion permeability and prescribed mechanical strength may be used. Examples of materials for the separator include olefin polymers, fluorine polymers, cellulosic polymers, polyimide, nylon, glass fiber, and alumina fiber. The form of the separator includes nonwoven fabric, woven fabric, and a finely porous film. A separator made of polypropylene, polyethylene, a mixture of polypropylene and polyethylene, a mixture of polypropylene and Teflon, or a mixture of polyethylene and Teflon is preferred. A finely porous film is preferred. A finely porous film having a pore size of 0.01 to 1 μm and a thickness of from 5 to 50 μm is particularly preferred.

The organic solvent used in the nonaqueous electrolytic solution includes propylene carbonate, ethylene carbonate, butylene carbonate, dimethyl carbonate, diethyl carbonate, λ-butyrolactone, 1,2-dimethoxyethane, tetrahydrofuran, 2-methyltetrahydrofuran, dimethyl sulfoxide, dioxolane, 1,3-dioxolane, formamide, dimethylformamide, nitromethane, acetonitrile, methyl formate, methyl acetate, methyl propionate, phosphoric triesters, trimethoxymethane, dioxolane derivatives, sulfolane, 3-methyl-2-oxazolidinone, propylene carbonate derivatives, tetrahydrofuran derivatives, diethyl ether, and 1,3-propanesultone. These solvents may be used either individually or in combination of two or more thereof.

Examples of the electrolyte includes $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, a lithium salt of a lower aliphatic carboxylic acid, $LiAlCl_4$, LiCl, LiBr, LiI, lithium chloroborane, lithium tetraphenylborate, and mixtures thereof. A preferred electrolytic solution comprises a mixed solvent of propylene carbonate or ethylene carbonate and 1,2-dimethoxyethane and/or diethyl carbonate having dissolved therein $LiCF_3SO_3$, $LiClO_4$, $LiBF_4$ and/or $LiPF_6$. A still preferred electrolytic solution comprises at least ethylene carbonate and $LiPF_6$.

The battery of the present invention may have any form, such as a button, a coin, a sheet, a cylinder, an angular shape, and the like. In a button or coin battery, the electrode material mixture is press-molded into a pellet. For use in a sheet, angular or cylindrical battery, the electrode material mixture is applied to an appropriate collector, dried, dehydrated, and pressed.

The battery is produced by putting electrodes in the form of a pellet, a sheet or a roll (electrodes rolled up together with separators) in a battery case, electrically connecting the case and one of the electrodes, pouring an electrolytic solution in the case, and sealing the open top.

The sealed-end battery case for use in the present invention is made up of a nickel-plated steel plate, a stainless steel plate (e.g., SUS 304, SUS 304L, SUS 304N, SUS 316, SUS 316L, SUS 430, SUS 444, etc.), a nickel-plated stainless steel plate (the same stainless steel listed above can be used), aluminum, an aluminum alloy, nickel, titanium or copper and may have a cylindrical form having a circular or elliptical base or a prismatic form having a square or rectangular base. Where the case is intended to function as a negative terminal, the case is preferably made of a stainless steel plate or a nickel-plated steel plate. Where the case is intended to serve as a positive terminal, the case is preferably made of a stainless steel plate, an aluminum plate or an aluminum alloy plate.

The gasket for use in the present invention is made of an olefin polymer, a fluorine polymer, a cellulosic polymer, polyimide or polyamide. Olefin polymers are preferred for their resistance to organic solvents and low moisture permeability. Propylene-based polymers are still preferred. A propylene-ethylene block copolymer is particularly preferred.

If desired, the battery of the present invention is covered with a sheathing material, such as a shrinkable tube, an adhesive tape, a metallic film, paper, cloth, paint, and a plastic case. At least part of the sheath may be made of a thermochromic material so that the thermal history during use could be seen.

If desired, a plurality of the batteries can be connected in series and/or parallel to make a battery pack. The battery pack can have safety elements, such as a PTC element, a temperature fuse, a fuse, and/or a current cutting-off element, and a safety circuit (a circuit having a function of monitoring the voltage, temperature, current, etc. of the individual batteries and/or the set of the batteries, if desired, combined with a function of shutting the current flow). The battery pack can also have external terminals in addition to the cathode and the anode for the battery set, such as cathode and anode terminals for the individual batteries, thermal sensor terminals for the battery set and the individual batteries, and a current sensor terminal for the battery set. The battery pack may contain a voltage converting circuit (e.g., a DC—DC convertor). The individual batteries can be connected by welding a lead plate or removably connected by means of sockets. The battery pack may have a function of displaying the residual capacity, necessity of a charge, the number of times of use, and the like.

The nonaqueous secondary battery of the present invention is useful in a wide variety of equipment. It is particularly preferred to use the battery in video cameras, portable video tape recorders with a monitor, movie cameras with a monitor, compact cameras, single-lens reflex cameras, disposable cameras (film with a lens), notebook personal computers, notebook word processors, pocket (palm-top) personal computers, mobile phones, wireless phone extensions, electrical shavers, electrical tools, motor mixers, automobiles, and so on.

As described above, if a nonaqueous secondary battery develops an abnormality, such as an overcharge or a shortcircuit, the battery temperature rises. As the abnormal state goes on in a sealed battery, the electrolytic solution begins to vaporize to increase the internal pressure. In particular, since the battery voltage is high in the case of an overcharge, decomposition of the electrolyte or the active material tends to take place suddenly at a certain point to cause the battery to ignite or burst. The sealed nonaqueous secondary battery according to the present invention prevents the worst in an overcharge, i.e., ignition or a burst of the battery. It has a structure such that the current flow can be cut off completely and precisely at the beginning of an increase in internal pressure. That is, since the current breaker is placed on the side of the explosion-proof valve opposite to the electrode group and is not exposed to the inner atmosphere, the vapor of the electrolytic solution is prevented from catching fire and causing a burst at the time of cut-off. Since the lead plate led from the cathode or anode of the electrode group is not broken or peeled off at the time of current cutting-off and therefore does not become rootless. Therefore, such a phenomenon does not occur that a broken piece of the lead plate contacts the inner wall of the battery case to cause an internal shortcircuit. Thus, the sealed nonaqueous secondary battery of the present invention is very safe against an overcharge or a shortcircuit.

The current cutting-off according to the present invention is brought about by the breakage of the first electric conductor at the grooved and thinned part thereof, so that the current cutting-off performance can be controlled by the tensile strength at break, which is a basic physical property, of the material used as an electric conductor. Therefore, the current cutting-off mechanism of the present invention works with higher precision as compared with the conventional electric cutting-off mechanism based on breakage of a welded joint or cramped joint. Further, after the current is cut off, the broken part of the current breaker is designed to withdraw by itself, thereby ensuring the current cutting-off.

In particular where the first electric conductor is made of aluminum or an aluminum alloy, and the thin part thereof is formed by grooving, the thin part has a small and extremely stable break strength, so that the current can be cut off without fail at the beginning of an increase of internal pressure. Where the second electric conductor is made of aluminum or an aluminum alloy and connected to the first electric conductor by welding, the joint has high strength and can be maintained stably against external shocks, such as vibration or a drop of the battery. Where the outer diameter of the second electric conductor is smaller than that of the first electric conductor, when the open top of the battery case is sealed, no outer force is imposed on the second electric conductor in the radial direction, so that the connection between the second electric conductor and the first electric conductor is protected from the influence of the outer force.

The invention will now be illustrated in greater detail with reference to Example, but it should be understood that the invention is not construed as being limited thereto. Unless otherwise indicated, all the parts area by weight.

EXAMPLE

Sealed nonaqueous secondary batteries shown in FIG. 1 were prepared by rolling up a cathode (comprising a collector coated with an active material mixture containing a positive electrode active material) and an anode (comprising a collector coated with an active material mixture containing a negative electrode material) with a separator interposed therebetween to form a group of electrodes 2, putting the roll into a battery case 1 with an insulator inserted on both the bottom and the top (the bottom and top insulators are indicated by numeral 3), and sealing the open top with a sealing part via an insulating gasket 5. The sealing part was connected to a lead plate 4 led from the cathode while a lead plate led from the anode was electrically connected to the case so that the sealing part and the case function as a positive terminal and a negative terminal, respectively.

1) Preparation of Cathode:

An aqueous slurry containing 87 parts of $LiCoO_2$ (active material), 6 parts of flake graphite (electric conducting agent), 3 parts of acetylene black (electric conducting agent), 3 parts of polytetrafluoroethylene dispersed in water (binder), and 1 part of sodium polyacrylate (binder) was applied on both sides of a 20 μm thick aluminum foil (collector) by an extrusion coating method, dried, and compressed by means of a calender press to form a cathode band having a thickness of 250 μm.

2) Preparation of Anode:

A dry blend consisting of 73.3 parts of tin monoxide, 19.5 parts of silicon dioxide, 3.5 parts of magnesium oxide, and 3.7 parts of boron oxide was calcined at 1200° C. for 10 hours in an argon atmosphere. After cooling, the calcined product was ground to obtain $SnSi_{0.6}Mg_{0.2}B_{0.2}O_{2.7}$ having an average particle size of 4.5 μm as a negative electrode material.

An aqueous slurry consisting of 88 parts of the above prepared negative electrode material, 6 parts of flake graphite (electric conducting agent), 4 parts of polyvinylidene fluoride dispersed in water (binder), 1 part of carboxymethyl cellulose (binder), and 1 part of lithium acetate was applied to both sides of a 18 μm thick copper foil (collector) by an extrusion coating method, dried, and compressed in the same manner as in the preparation of the cathode to obtain an anode band having a thickness of 78 μm.

3) Assembly:

Each of the cathode and the anode was dehydrated in a low humidity atmosphere (dew point: −50° C.) using a far infrared heater at 150° C. for 2 hours and cut to a prescribed size. An aluminum lead plate and a nickel lead plate were connected to one end of the cathode and the anode, respectively. The cathode and the anode were put together with a finely porous polypropylene film separator (Cell Guard #2400, produced by Hoechst Celanese Corporation) therebetween and rolled up to form an electrode group. The electrode group was put into a battery case (a sealed-end circular cylinder made of a nickel-plated steel plate), and an electrolytic solution of 0.95 mol/l of $LiPF_6$ and 0.05 mol/l of $LiBF_4$ dissolved in a 2:8 mixture (by volume) of ethylene carbonate and diethyl carbonate was poured therein. The open top of the battery case was sealed with a sealing part hereinafter described via a gasket made of a propylene-ethylene copolymer resin to obtain a cylindrical battery having a diameter of 18 mm and a height of 65 mm.

Battery 1:

As shown in FIG. 1, the sealing part comprised, from the top, a terminal cap 8 having a vent 8a, a current breaker 7, and an explosion-proof valve 6.

Figure 2:
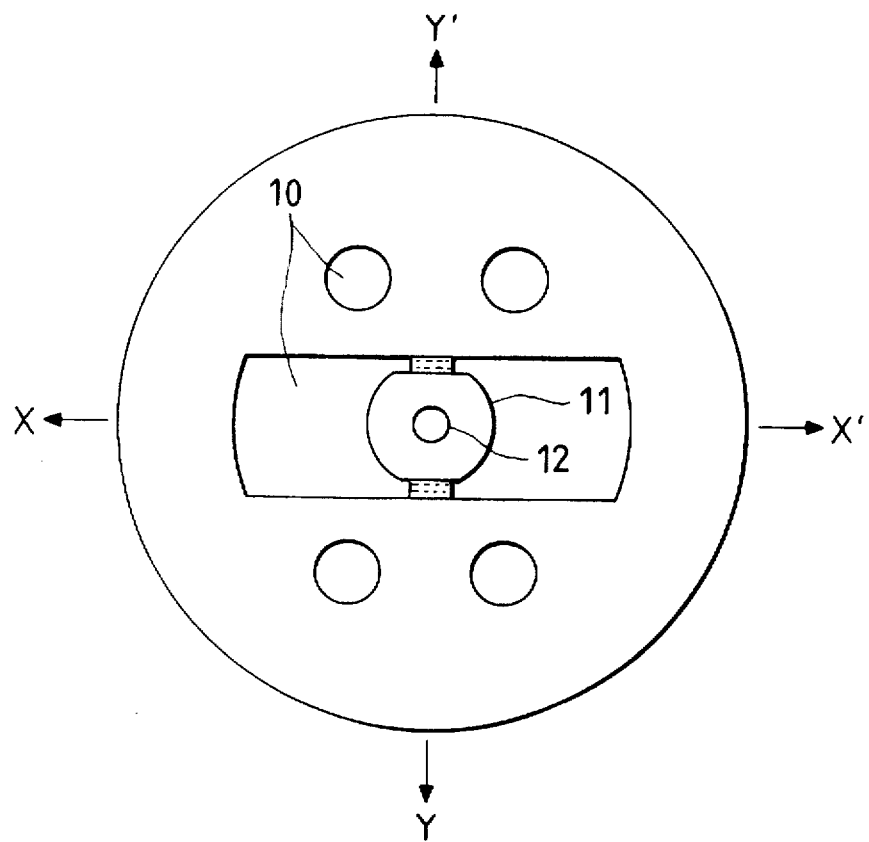
FIG. 2 is a plane view of the first electric conductor of the current breaker used in the battery of FIG. 1.
Figure 3A:
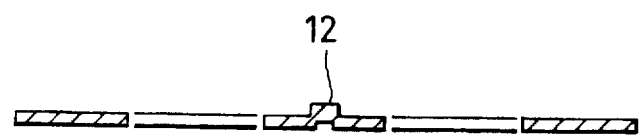
FIG. 3 is cross sections of the first electric conductor shown in FIG. 2 along line X—X' and line Y—Y'.
Figure 3B:
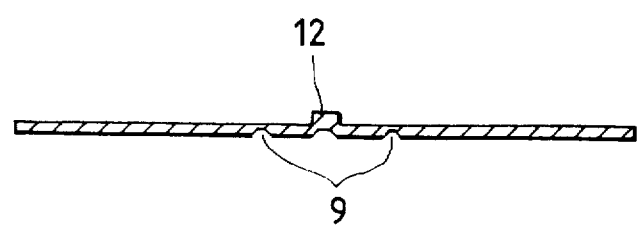
Figure 4:
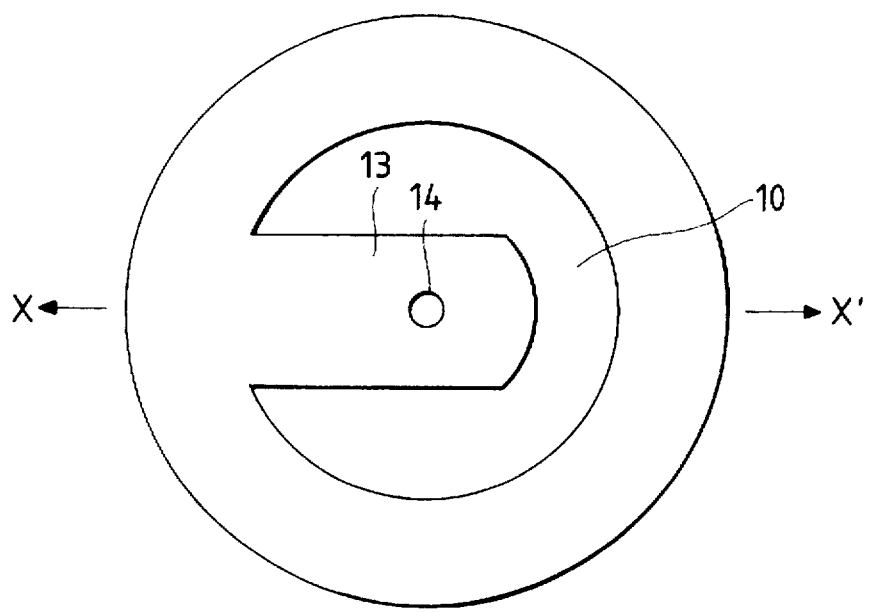
FIG. 4 is a plane view of the second electric conductor of the current breaker used in the battery of FIG. 1.
Figure 5:
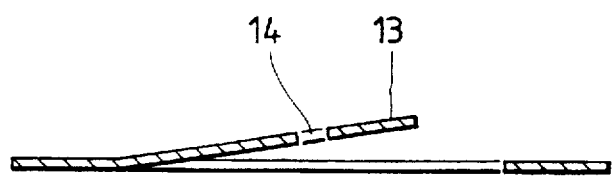
FIG. 5 is a cross section of the second electric conductor shown in FIG. 4 along line X—X'.

The current breaker 7 comprised, from the explosion-proof valve side, a laminate of a first electric conductor 7a, an intermediate insulator 7c, and a second electric conductor 7b, and a PTC element 7d. As shown in FIG. 2, the first electric conductor had a ring form with a bridge 11 in the center thereof. As shown in FIG. 3, both ends of the bridge were grooved on its explosion-proof valve side to provide thin parts 9. As shown in FIG. 4, the second electric conductor had a ring form with a pier 13 extending from the ring to the center of the ring, and the pier was previously bent upward (toward the terminal cap) as shown in FIG. 5.

The first electric conductor had a small projection 12 on the central bridge 11, and the second electric conductor had a small hole 14 in the pier 13. The second electric conductor was laminated on the first electric conductor via an intermediate insulator 7c in such a manner that the lengthwise direction of the pier of the former and the lengthwise direction of the bridge of the latter might make a right angle, and the two electric conductors were mechanically connected by cramping the projection 12 into the hole 14.

Figure 6:
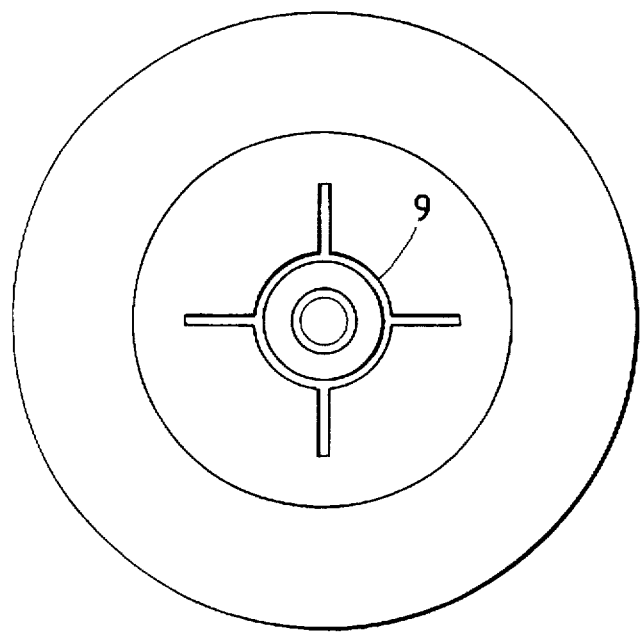
FIG. 6 is a plane view of the explosion-proof valve used in the battery of FIG. 1.

The explosion-proof valve had a dish shape having a flat round base which was projected from near the periphery toward the electrode group. At the center of the flat round base was integrally formed a projection toward the current breaker. As shown in FIG. 6, the flat round base had a concentric groove and four linear grooves extending from the concentric groove to provide a thin part 9. Because of this structure, when the explosion-proof valve is deformed due to an increase in internal pressure, the central projection of the explosion-proof valve comes into contact with the lower side of the central bridge of the first electric conductor.

The PTC element used was "Polyswitch", a trade name of the product produced by Raychem Co., Ltd.

The first electric conductor was made of a 0.4 mm thick plate of aluminum, JIS A1100 P-H24. The bridge of the first electric conductor had a length of 2.8 mm, and the thin parts (grooves) at both ends of the bridge each had a thickness of 0.08 mm, a width of 0.4 mm, and a length of 1.1 mm. The second electric conductor was made of a 0.15 mm thick nickel-plated phosphor bronze plate. The width of the pier of the second electric conductor was 3.6 mm. A 0.125 mm thick polyester film was used as the insulator.

The explosion-proof valve was made of a 0.3 mm thick plate of JIS A1050 P-H24 aluminum. The flat round base of the explosion-proof valve had an outer diameter of 12 mm, and the height of the sides (the depth of the dish shape) was 1 mm. The central projection of the flat base had an outer diameter of 2.2 mm and a height of 0.8 mm. The above-described structure and dimensions were design so that the current cutting-off mechanism might work at an internal pressure of 12 kgf/cm$^2$. The whole current breaker and the explosion-proof valve had the same outer diameter, 16 mm.

A battery prepared by using the above-described sealing part was designated battery 1.

Battery 2:

Battery 2 was prepared in the same manner as for battery 1, except for using a first electric conductor made of a 0.3 mm thick JIS A3003 P-H24 aluminum plate which had a bridge length of 3.5 mm with its thin part at each end of the bridge having a thickness of 0.08 mm, a width of 0.4 mm, and a length of 1 mm, using a second electric conductor whose pier had a width of 4.2 mm, and using an explosion-proof valve whose central projection had an outer diameter of 2.5 mm and a height of 0.9 mm.

Battery 3:

Battery 3 was prepared in the same manner as for battery 1, except for using a first electric conductor made of a 0.35 mm thick JIS A5052 P-H24 aluminum plate which had a bridge length of 4 mm with its thin part at each end of the bridge having a thickness of 0.08 mm, a width of 0.4 mm, and a length of 0.9 mm, using a second electric conductor whose pier had a width of 4.5 mm, and using an explosion-proof valve whose central projection had an outer diameter of 2.8 mm and a height of 0.9 mm.

Batteries 4 to 6:

Batteries 4 to 6 were prepared in the same manner as for battery 1, except for using a second electric conductor having a thickness of 0.15 mm and made of JIS A1100 P-H18 aluminum (battery 4), JIS A3003 P-H18 aluminum (battery 5) or JIS A5052 P-H18 (battery 6).

Battery 7:

Battery 7 was prepared in the same manner as for battery 6, except that the first electric conductor and the second electric conductor were connected by mechanical cramp followed by laser welding of the small projection of the first electric conductor and the periphery of the small hole of the second electric conductor.

Batteries 8 to 9:

Batteries 8 and 9 were prepared in the same manner as for battery 1, except that the first electric conductor made of JIS A1100 P-H24 aluminum and a second electric conductor made of JIS A5052 P-H18 aluminum were superimposed via the intermediate insulator and connected at the central portion by ultrasonic welding (battery 8) or laser welding (battery 9).

Batteries 10 to 13:

Batteries 10 to 13 were prepared in the same manner as for batteries 6 to 9, respectively, except for changing the outer diameter of the second electric conductor to 15.5 mm to make it smaller than that of the first electric conductor.

Figure 7:
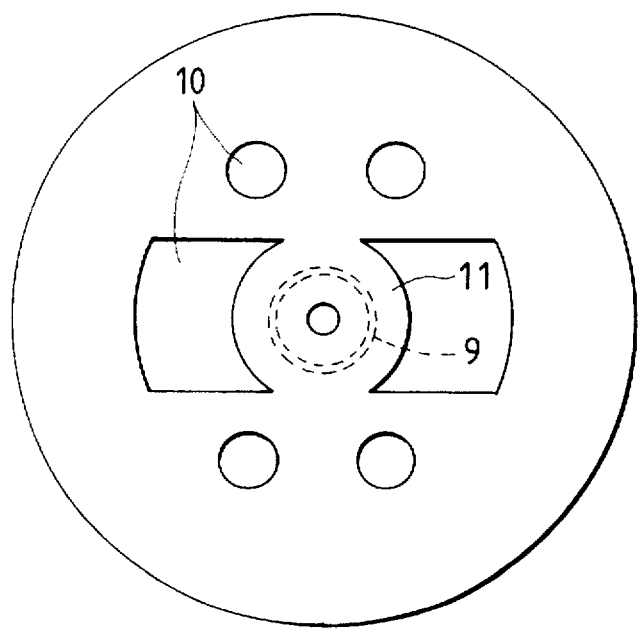
FIG. 7 is a plane view of the first electric conductor used in another example of the battery according to the present invention.

Battery 14:

Battery 14 was prepared in the same manner as for battery 11, except that the first electric conductor made of JIS A1100 P-H24 aluminum had the structure shown in FIG. 7, in which the first electric conductor had a ring form with a bridge 11 at the center thereof, the bridge having a concentric groove around its center to provide a thin part 9. The bridge had a length of 5.5 mm, the concentric groove had an outer diameter of 3 mm and a width of 0.4 mm, and the thin part (grooved part) had a thickness of 0.08 mm.

Figure 8:
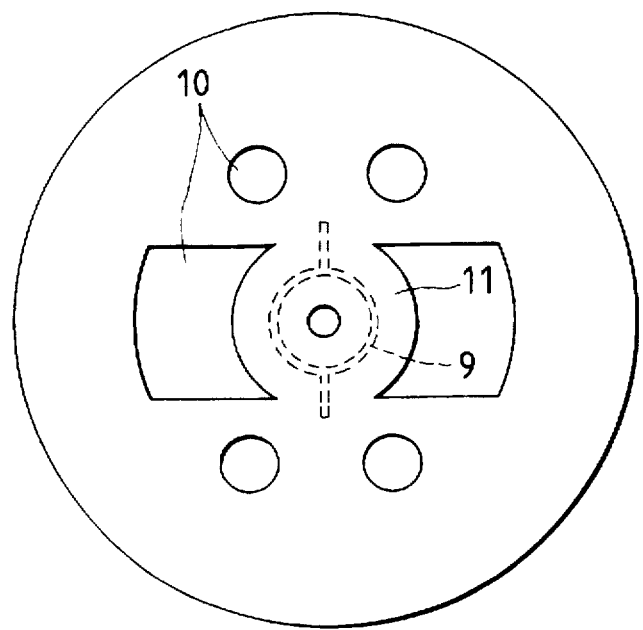
FIG. 8 is a plane view of the first electric conductor used in still another example of the battery according to the present invention.
Figure 9:
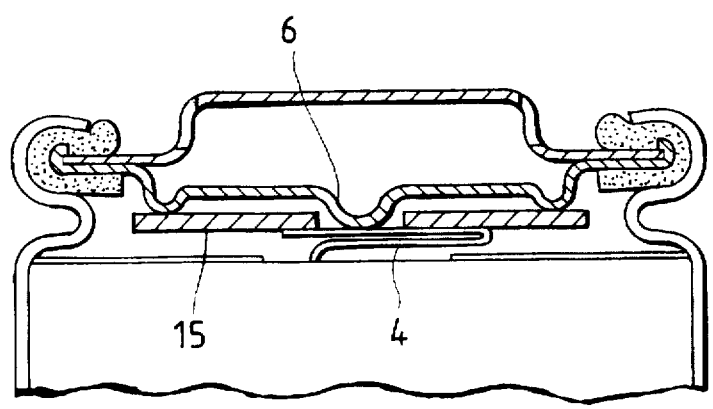
FIGS. 9 to 12 are each a partial schematic cross section of a conventional sealed battery.

Battery 15:

Battery 15 was prepared in the same manner as for battery 14, except that the thin part 9 additionally had two linear grooves extending from the concentric groove in the same direction of the bridge as shown in FIG. 8. The linearly grooved thin part had a length of 2 mm, a thickness of 0.08 mm, and a width of 0.4 mm.

Battery 16:

Battery 16 was prepared in the same manner as for battery 1, except that the second electric conductor had a thickness of 0.15 mm and an outer diameter of 15.5 mm and was made of a shape memory alloy so that the pier might be deformed toward the terminal cap with an increase in temperature.

Battery 17:

Battery 17 was prepared in the same manner as for battery 11, except that the explosion-proof valve side of the first electric conductor at the area sandwitched in between the two thin parts formed by the side of the central joint area was coated with a nonconductive resin.

Figure 10:
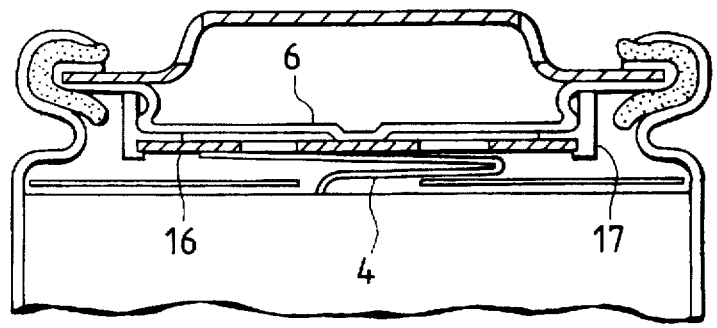
Figure 11:
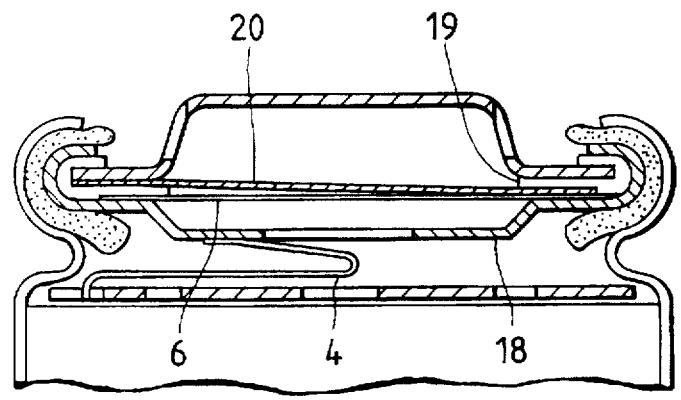
Figure 12:
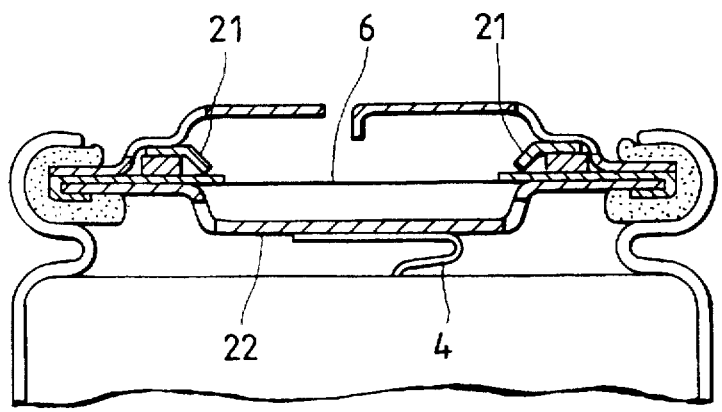

Batteries 18 to 19:

Batteries 18 and 19 were prepared by using the sealing part shown in FIG. 10, which is in accordance with JP-A-5-343043, (batter 18) or the sealing part shown in FIG. 11, which is in accordance with JP-A-6-215760, (battery 19). For ready comparison, these batteries were designed so as to cut off the current flow at the same working internal pressure as that of battery 1.

A drop test was applied to batteries 1 to 17 according to the present invention and comparative batteries 18 to 19, in which each battery was dropped from the height of 1.5 mm onto concrete 20 times (n=200). Then the battery was continuously charged at a charging current of 1 A (n=50).

In Table 1 below are shown the number of the batteries which showed an increase in battery resistivity caused by the drop test (A: the number of batteries which showed a 10 to 20% increase; B: the number of batteries which showed a 21 to 50% increase; C: the number of batteries which showed a 51% or more increase; D: the number of batteries whose current flow was completely cut off), the number of batteries (X) which ignited or burst on continuous charging following the drop test, and the battery internal pressure (P) at which the current cutting-off mechanism worked normally to cut off the current.

TABLE 1

| Battery No. | A | B | C | D | X | P (kgf/cm$^2$) |
|---|---|---|---|---|---|---|
| 1 | 1 | 2 | 0 | 0 | 0 | 11 to 13 |
| 2 | 0 | 2 | 0 | 0 | 0 | 11 to 13 |
| 3 | 1 | 1 | 0 | 0 | 0 | 11 to 13 |
| 4 | 3 | 0 | 0 | 0 | 0 | 11 to 13 |
| 5 | 2 | 0 | 0 | 0 | 0 | 11 to 13 |
| 6 | 1 | 1 | 0 | 0 | 0 | 11 to 13 |
| 7 | 1 | 0 | 0 | 0 | 0 | 11 to 13 |
| 8 | 1 | 0 | 0 | 0 | 0 | 11 to 13 |
| 9 | 1 | 0 | 0 | 0 | 0 | 11 to 13 |
| 10 | 0 | 0 | 0 | 0 | 0 | 11 to 13 |
| 11 | 0 | 0 | 0 | 0 | D | 11 to 13 |
| 12 | 0 | 0 | 0 | 0 | 0 | 11 to 13 |
| 13 | 0 | 0 | 0 | 0 | 0 | 11 to 13 |
| 14 | 0 | 0 | 0 | 0 | 0 | 11 to 15 |
| 15 | 0 | 0 | 0 | 0 | 0 | 11 to 14 |
| 16 | 1 | 1 | 0 | 0 | 0 | 11 to 13 |
| 17 | 0 | 0 | 0 | 0 | 0 | 11 to 13 |
| 18 | 0 | 0 | 5 | 2 | 3 | 6 to 13 |
| 19 | 0 | 0 | 0 | 0 | 5 | 11 to 18 |

Among 3 batteries 18 which ignited or burst, the ignition or burst of 2 batteries seems to have been caused by ignition of the vapor of the electrolytic solution from the sparks sent out on current cutting-off. The internal pressure of one battery of the 3 batteries did not increase up to the set value. It seems that the explosion-proof valve developed cracks or pinholes during assembly or drop testing.

Two of 5 batteries 19 that ignited or burst resumed being charged after the current flow was once cut off. This seems to be because a rootless broken piece of the lead formed a route for current flow again. In 3 of the 5, the internal pressure did not increase to the set value, from which the ignition or burst is believed to have been caused by the cracks of the explosion-proof valve similarly to the case of battery 18.

Some batteries 18 cut off their current at a low internal pressure. It seems that their current cutting-off mechanism have nearly worked during the drop test. Some batteries 19 cut off their current at a stage of a high internal pressure. It appears that the internal pressure did not increase easily due to very small pinholes which had been produced during the drop test.

On the other hand, in all the batteries according to the present invention the current cutting-off mechanism worked normally and surely, and no ignition nor burst occurred.

It is seen that the batteries of the present invention in which the first and second electric conductors are made of aluminum or an aluminum alloy and are connected to each other by welding exhibit sufficiently high strength at the joint to maintain the connection stably against external shocks, such as a drop. It can also be seen that, when the second electric conductor is smaller than the first electric conductor in diameter, since the second electric conductor receives no outer force exerted in the radial direction at the time of sealing the battery case, the stability of the joint can further be assured.

While the safety valve used in the batteries of Example had such a structure that the flat fringe, the side, and the flat base form the shape of the letter "Z" and a projection toward the current breaker is integrally formed at the center, the cut-off mechanism of the invention also works when other types of a safety valve were used. That is, the same effects were produced in using an explosion-proof valve of the type disclosed in JP-A-8-153536 which is prepared by cast molding and whose thickness at the "side" is larger than that of the "flat base" or an explosion-proof valve of the type in which a separately prepared resin molded part is provided in place of the integrally formed projection.

As has been fully described, since the sealed nonaqueous secondary battery of the present invention has a current breaker between an explosion-proof valve and a terminal cap and, after cutting off the current flow, a broken piece of the current breaker is designed to withdraw by itself, it is possible to cut off the current in the battery surely and safely in the beginning of an increase in internal pressure. In addition, the current breaker can be made up apart from the explosion-proof valve, its function can be confirmed before it is incorporated into a battery, thereby providing a highly reliable and safe close nonaqueous secondary battery.

While the invention has been described in detail and with reference to specific examples thereof, it will be apparent to one skilled in the art that various changes and modifications can be made therein without departing from the spirit and scope thereof.

What is claimed is:

1. A sealed nonaqueous secondary battery comprising a sealed-end battery case containing a group of electrodes assembly composed of a cathode, and an anode both capable of intercalating and deintercalating a light metal, a separator therebetween, and a nonaqueous electrolytic solution, the opening of said battery case being sealed with an insulating gasket which is provided at the inner periphery of said opening and a sealing part which is held by said gasket and serves as a cathode or anode terminal, wherein said sealing part comprises an explosion-proof valve which is capable of being deformed to the direction opposite to said electrodes assembly with an increase in internal pressure, a vented terminal cap which is provided above said explosion-proof valve in the side opposite to said electrodes assembly, and a current breaker which is provided between said explosion-proof valve and said terminal cap and of which the thin part is broken by actuation of the explosion-proof valve deformed to the side opposite to the electrode group with increase of internal pressure of the battery; said current breaker having a piled structure composed of a first electric conductor having a penetrated hole which is provided at a side of said explosion-proof valve, an intermediate insulator having a penetrated hole at the central portion thereof, and a second electric conductor having a penetrated hole which is provided at a side of said terminal cap; said first electric conductor and said second electric conductor being electrically connected by clamping and/or welding at the center thereof; and said first electric conductor having a thin part having a thickness of from 0.05 mm to a half of the thickness of the first electric conductor at the periphery of its central joint with said second electric conductor.

2. The sealed nonaqueous secondary battery as claimed in claim 1, wherein said first electric conductor of said current breaker comprises aluminum or an aluminum alloy, and said thin part of said first electric conductor is formed by grooving.

3. The sealed nonaqueous secondary battery as claimed in claim 1, wherein said second electric conductor comprises aluminum or an aluminum alloy and is electrically connected to said first electric conductor by welding.

4. The sealed nonaqueous secondary battery as claimed in claim 1, wherein the outer diameter of said second electric conductor is smaller than that of said first electric conductor.

5. The sealed nonaqueous secondary battery as claimed in claim 1, wherein the second electric conductor is a ring shape having a projection which is pushed up from the peripheral portion to the central portion.

6. The sealed nonaqueous secondary battery as claimed in claim 1, wherein said explosion-proof valve is capable of being deformed toward the current breaker with an increase in internal pressure to push up the central joint to thereby break said thin part of the first electric conductor, and said second electric conductor at said central joint is capable of being deformed by itself toward the terminal cap together with the broken part of the first electric conductor remaining connected thereto to thereby cut off the current flow.

* * * * *